United States Patent [19]

Cooper, deceased et al.

[11] 3,932,598

[45] Jan. 13, 1976

[54] PROCESS FOR PRODUCING ALKALI METAL CHROMATES AND DICHROMATES

[76] Inventors: Hugh S. Cooper, deceased, late of Shaker Heights, Ohio; Henry J. Rand, executor, 25801 Lake Shore Blvd., Euclid, Ohio 44132

[22] Filed: Apr. 24, 1970

[21] Appl. No.: 31,528

[52] U.S. Cl. .............. 423/596; 423/597; 423/61; 423/53; 423/633
[51] Int. Cl.² ........................................ C01G 37/14
[58] Field of Search ........ 23/56, 1 D; 423/595, 596, 423/597, 53

[56] References Cited
UNITED STATES PATENTS

| 901,436 | 10/1908 | Gibbs | 23/56 |
| 1,526,325 | 2/1925 | Drefahl | 23/56 |
| 2,402,102 | 6/1946 | Udy | 23/56 |
| 3,046,091 | 7/1962 | Van Hoozer | 23/56 |

FOREIGN PATENTS OR APPLICATIONS

| 255,078 | 2/1927 | United Kingdom | 23/56 |
| 320,845 | 10/1929 | United Kingdom | 23/56 |

Primary Examiner—Herbert T. Carter

[57] ABSTRACT

An improved process for producing alkali metal chromates and dichromates wherein ferrochrome alloy containing at least 1% carbon by weight is reacted with a molten mixture of an alkali metal nitrate and an alkali metal carbonate at a temperature of at least 350°C. The ferrochrome alloy can be prepared by smelting chromite ore in the presence of carbon.

19 Claims, 2 Drawing Figures

PROCESS FOR PRODUCING ALKALI METAL CHROMATES AND DICHROMATES

This invention relates to the production of metal chromates and dichromates, and more particularly to a process for the production of alkali metal chromates and dichromates.

Commercial processes now in use for the production of chromates and dichromates, and particularly sodium chromate and dichromate, date back to 1880 to the well known soda ash process. In this process, chromite, an ore containing about 44 to 50% by weight $Cr_2O_3$ with the balance being composed of FeO, $Al_2O_3$, $SiO_2$, MgO and trace amounts of vanadium, is roasted in the presence of sodium carbonate and lime at very high temperatures, of the order of 1100°C., in large kilns, some of which have a diameter of 7 to 9 feet and a length of 60 to 180 feet.

Thereafter, the roasted mix is leached with water to form a slurry containing sodium chromate and a large quantity of solids including compounds of iron, aluminum, silicon, magnesium, vanadium as well as chromium. The solids are separated from the chromate-containing solution, and roasted again in order to utilize the residual chromium content of the solids, either by recycling the solids to the kiln or by feeding the solids to a subsequent kiln.

Because chromite ore contains only about 44 to 50% by weight chromium oxide, the soda ash process is described above involves the handling and purchase of vast quantities of material on a commercial scale because no means have heretofore been devised to separate gangue material at an early stage of the process. As is apparent to those skilled in the art, the requirement of processing such large quantities of solids necessitates the use of equipment having large capacities and otherwise serves to increase material handling, labor and chemical processing difficulties.

It is accordingly an object of the present invention to provide a new and improved process for producing chromates and dichromates which overcome the foregoing disadvantages.

It is a more specific object of the present invention to provide a new and improved process for producing chromates and dichromates in which a minimum quantity of materials is processed in an economical manner to produce chromates and dichromates of high quality at high yields.

These and other objects and advantages of the invention will appear hereinafter, and, for purposes of illustration, but not of limitation, an embodiment of the invention is shown in the accompanying drawings in which.

Figure 1:
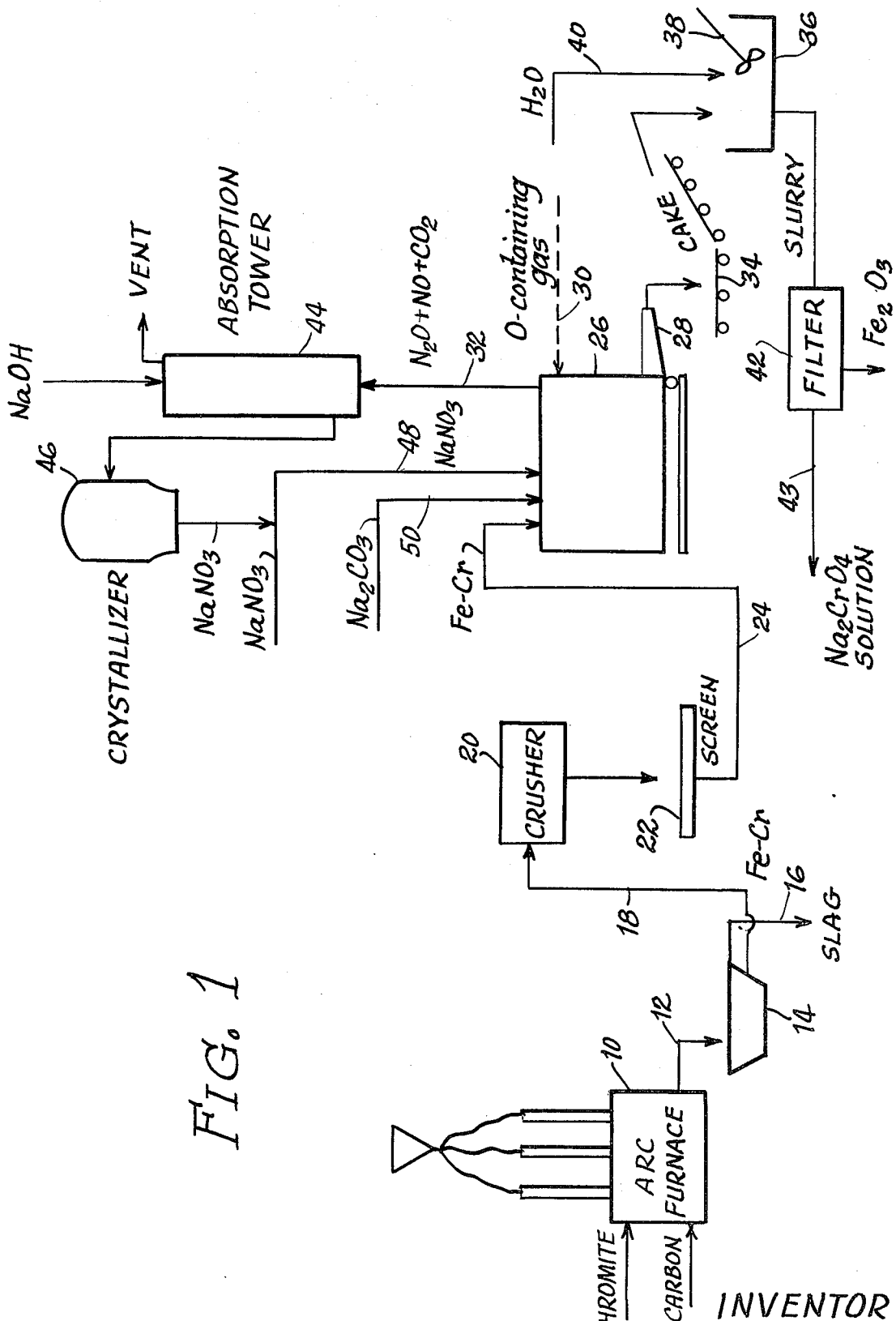
FIG. 1 is a flow diagram illustrating a process for producing chromates.

The concepts of the present invention reside in a completely new approach to the production of alkali metal chromates and dichromates wherein use is made of a chromium-containing starting material in which nearly all of the gangue material, including metal oxides such as silica magnesia and alumina have been removed to significantly decrease the quantities which must be processed. The invention will be described with reference to the production of sodium chromate and sodium dichromate; however, it is to be understood that the concepts of the invention are equally applicable to the production of other alkali metal chromates and dichromates, including, for example, the chromates and dichromates of lithium, potassium, etc.

In accordance with the practice of the present invention, it was been found that alkali metal chromates can be prepared by reacting a ferrochrome alloy containing relatively large amounts of carbon with a molten mixture of an alkali metal nitrate and an alkali metal carbonate. Without limiting the invention as to theory, it is believed that the reaction occurs in accordance with the following equation:

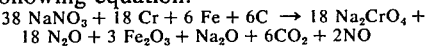

$$38\ NaNO_3 + 18\ Cr + 6\ Fe + 6C \rightarrow 18\ Na_2CrO_4 + 18\ N_2O + 3\ Fe_2O_3 + Na_2O + 6CO_2 + 2NO$$

As is apparent from the foregoing equation, it is essential to the practice of the invention that the ferrochrome contain at least 1.0% by weight carbon, and preferably an amount within the range of 1–10% by weight carbon. The reaction of a ferrochrome containing less than 1.0% carbon is quite slow, and for that reason, commercially unacceptable.

Alloys containing greater than 10% by weight carbon can be used, but require higher reaction temperatures. Best results are usually achieved when the ferrochrome starting material contains 60–70% by weight chromium and 4–8% by weight carbon with the balance being iron (usually about 15–35%) and trace amounts of aluminum in the form of alumina, silicon in the form of silica and vanadium.

As indicated above, the ferrochrome is reacted with a molten mixture of sodium nitrate and sodium carbonate. The reaction is preferably carried out at a temperature greater than 350°C. to insure that the chromium contained in the ferrochrome is oxidized to $Cr^{+6}$. It has been found that temperatures below 350°C. result in a significant quantity of $Cr^{+3}$, thereby adversely affecting the chromate yield. Best results are usually obtained when the temperature of the molten bath is within the range of 350° to 900°C., and preferably 400° to 700°C., during the reaction.

Since most alkali metal nitrates, and particularly $NaNO_3$ and $KNO_3$, decompose at temperatures around 380°C., it is believed that the alkali metal carbonate in the molten bath serves at least in part to stabilize the nitrate at the temperatures employed in the reaction. Thus, the bath should contain at least 2% by weight of the carbonate, and preferably 2–50% by weight. Best results are usually obtained when the carbonate content of the molten bath is within the range of 7–15% based upon the total weight of the bath.

The quantity of ferrochrome added to the bath is not critical and can be varied within fairly wide ranges. In general, the ferrochrome should be added to the bath in an amount to provide a molar ratio of alkali metal nitrate to chromium in the ferrochrome of less than 4:1, and preferably within the range of 1.5:1 to 2.5:1. The time for reaction can be varied within wide ranges, with the exact reaction time depending upon the temperature of the molten bath and the rate of addition of the ferrochrome. Reaction times within the range of 0.1 to 10 hours are generally sufficient.

The reaction is initially quite exothermic, with the rapid evolution of reaction gaseous causing considerable foaming in the molten bath. However, the reaction then appears to go through an endothermic phase and ends as an exothermic reaction. However, the endothermic phase can be avoided, if desired, by controlling the rate at which the ferrochrome, which is preferably in finely divided form, is added to the bath, such as by adding a fresh quantity of ferrochrome as the reaction tends to subside before going into the endothermic phase.

In accordance with one embodiment of the process of the invention, the ferrochrome is added in one or more increments as the reaction proceeds. For this purpose, it is frequently desirable to add between one-third and one-tenth of the total amount of ferrochrome added in three or more increments, with each addition being made as the evolution of reaction gases begin to subside. Additions of ferrochrome in this manner facilitate a relatively smooth and uniform reaction.

In accordance with another method for adding finely divided ferrochrome to the molten bath, it has been found that the finely divided ferrochrome can be continuously fed to the bath by spraying a stream of ferrochrome particles suspended in an oxygen-containing gas, such as air, onto the surface of the bath. This method of supplying ferrochrome to the bath is particularly advantageous in that it facilitates the continuous addition of ferrochrome without excessive foaming and provides a source of oxygen in the reaction vessel which is believed to at least in part minimize the formation of $Cr^{+3}$ in the bath.

Regardless of which of the above methods is used to supply ferrochrome to the molten bath is used, it has been found that generally no agitation of the contents of the bath is required, although the bath may be agitated if desired. In most cases, the evolution of reaction gas causes sufficient foaming to insure relatively thorough mixing of the contents of the bath.

A wide variety of reaction vessels or furnace linings can be used in accordance with the practice of the invention, including those formed of cast iron, chromized steel, mullite, which is preferred for industrial scale furnaces, and the like. When using a closed reaction vessel, it is frequently desirable to supply the vessel with an oxygen-containing gas, such as air, to minimize $Cr^{+3}$ formation as described above, and to facilitate exhaustion of reaction gases, including nitrous oxide, nitric oxide and carbon dioxide. A fairly rapid rate of exhaustion of these gases is desirable to further aid in temperature control of the reaction.

After the reaction of the ferrochrome is complete, the bath contains primarily sodium chromate and ferric oxide. The chromate content of the bath can be removed by leaching with water, either with or without cooling of the bath prior to the leaching operation. When dichromate is the desired product the chromate can be converted to the dichromate with the use of sulfuric acid. This is common practice in the soda ash process.

In accordance with the preferred practice of the present invention, the ferrochrome alloy for use in the chromate process as described above is formed by smelting chromite ore in the presence of carbon. In this way, use can be made of the relatively inexpensive chromite ore as the starting material for use in the preparation of chromates and dichromates.

The smelting of the chromite ore in the presence of carbon serves to separate most of the usual components of chromite, including alumina, silica and magnesia to reduce the bulk of the material to be processed and provide a convenient source of the ferrochrome. According to this concept of the invention, use can be made of any of the chemical and metallurgical grades of chromite ore, which typically have one of the following compositions. The metallurgical grade, however, is preferred.

TABLE I

| Chemical Grade | |
|---|---|
| $Cr_2O_3$ | 44.3% |
| Total iron as Fe | 19.2 |
| $SiO_2$ | 3.5 |
| $Al_2O_3$ | 14.2 |
| MgO | 10.1 |
| CaO | 0.4 |
| Vanadium as V | 0.2 |

TABLE II

| Metallurigcal Grade | |
|---|---|
| $Cr_2O_3$ | 51.0% |
| FeO | 11.6 |
| $SiO_2$ | 6.5 |
| $Al_2O_3$ | 15.6 |
| MgO | 11.3 |
| CaO | 0.4 |
| V | 0.2 |

Smelting of chromite with carbon to make high carbon ferro chromium is performed in three phase arc furnaces with open tops, the electrodes being submerged about 3 to 6 feet under the charge. Lump ore is always used and the recovery of chromium is about 90–95%. Sufficient carbon should be used to provide a carbon content of about 1–10% by weight in the final product. The chemistry involved in the reduction is represented by the following equations:

$$Cr_2O_3 + 3\ C \rightarrow 2\ Cr + 3\ CO$$
$$Fe\ O + C \rightarrow Fe{-}CO$$

After smelting, the ferrochrome is separated from the slag, including the alumina, magnesia and silica contained in the raw ore, crushed to finely divided form and is ready for use in the preparation of chromate.

Referring now to FIG. 1, which illustrates a typical flow diagram of a process embodying the concepts of the invention, a chromite ore of the type described is fed to a smelting furnace 10, which is of the electric arc type, in which the chromite ore is smelted in the presence of carbon to purify and concentrate the chromium present in the ore in the form of a ferrochrome alloy containing at least 1% by weight carbon. The temperature of the smelting furnace can be maintained within the desired range by controlling the current and voltage supplied to the electrodes. Also fed to the furnace 10 is a charge of carbon, such as coke or the like. The amount of carbon fed to the furnace will depend upon the composition of the chromite ore and the desired carbon level in the ferrochrome.

The effluent from arc furnace 10 is fed to a separator 14 by line 12 from which the impurities in the chromite ore including alumina, silica, magnesia, etc. are separated as slag and removed through line 16. The carbon-containing ferrochrome alloy is allowed to solidify and is then fed through line 18 to a crusher 20 in which it is pulverized to finely divided form, preferably to sizes within the range of 40 to 200 mesh. The ferrochrome particles having the desired particle sizes pass through a screen 22 and are fed to reaction vessel 26 by line 24. If desired, larger particles which are retained on screen 22 can be recycled to crusher 20; smaller particles and finer can be separated in a conventional manner and recycled to the separator 20 to be remelted.

The reaction vessel 26 exemplified in FIG. 1 is a closed furnace which can be tilted to pour the molten bath through a trough 28. Tilt furnace 26 is preferably provided with a spray nozzle (not shown in the drawing) for feeding the finely divided ferrochrome to the surface of the bath. Alternatively, the reactor is optionally provided with an inlet 30 through which an oxygen-containing gas can be introduced to the reactor to aid in exhausting the gases evolved during the reaction through exhaust 32 and to prevent or minimize the formation of chromium in the +3 oxidation state. Furnace 26 is also provided with conventional heating means.

After the reaction between the ferrochrome and the molten bath is completed, the bath can be poured out of furnace 26 through trough 28 onto a conveyor 34 from which it is conveyed, either with or without cooling and solidification, to a leach tank 36 equipped with an agitator 38 in which the chromate contained in the furnace effluent is leached with water supplied to tank 36 through line 40.

The quantity of water added to the cake from furnace 26 is not critical and should be an amount sufficient to dissolve substantially all of the alkali metal chromate contained in the cake. Best results are usually obtained when sufficient water is added to form a solution containing between 10–60% by weight of the chromate. Due to the presence of $Na_2O$ in the furnace cake, the $Na_2O$ is also leached from the cake into the aqueous solution to provide a leach solution having a pH usually within the range of 11.5 to 13.5.

While not illustrated in the drawing, it is frequently desirable to acidify the chromate leach slurry with, for example, sulfuric acid in order to precipitate any vanadium contained in the leach solution. It has been found that adjustment of the pH of the slurry to about 9 will result in the precipitation of vanadium from the leach solution to thereby provide a final product having a significantly lower vanadium content than products produced in the soda ash process of the prior art.

After acidification to precipitate vanadium compounds, the leach slurry is filtered in a filter 42 to separate ferric oxide solids from the chromate-containing solution which passes from filter through line 43.

If desired, the nitric oxide contained in the reaction gases vented through line 32 from reaction vessel 26 can be reclaimed by absorption in aqueous sodium hydroxide in absorption tower 44. The aqueous solution of sodium nitrate formed in absorption column 44 is then fed to a crystallizer 46 in which water is removed and the sodium nitrate fed to reaction vessel along with fresh sodium nitrate through line 48 and fresh sodium carbonate through line 50 to replenish the contents of the molten bath.

Figure 2:
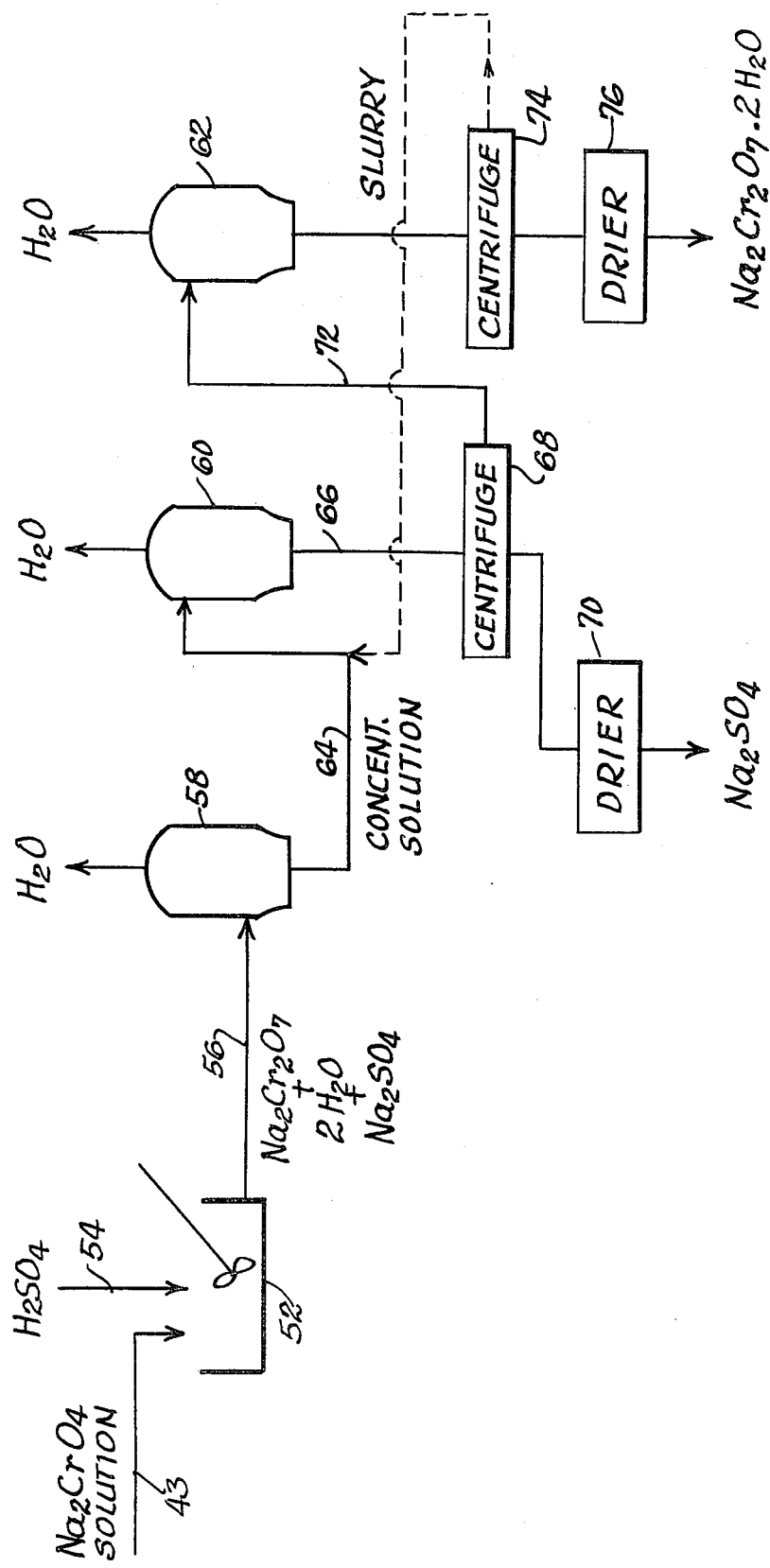
FIG. 2 is a flow diagram for a process for converting chromates to dichromates.

When it is desired to produce a dichromate, the chromate solution which is discharged through line 43 from filter 42 is fed to a conversion tank 52 (FIG. 2) where it is reacted with sulfuric acid supplied to tank 52 through line 54. The quantity of sulfuric acid added to conversion tank 52 is not critical and can be varied within wide ranges, depending upon the concentration of chromate in the solution. Best results are usually achieved when stoichiometric amounts of acid are used in accordance with the following equation:

$$2\ Na_2CrO_4 + H_2SO_4 \rightarrow Na_2Cr_2O_7 + Na_2SO_4 + H_2O$$

The solution of alkali metal dichromate and alkali metal sulfate withdrawn from tank 52 through line 56 can be separated in a conventional manner. In the process illustrated in FIG. 2, the separation of the dichromate and the sulfate can be conveniently effected by a triple effect evaporator system comprising evaporators 58, 60 and 62. The chromatesulfate solution is fed to the first evaporator 56 in which the aqueous solution is first concentrated, with the concentrated solution being withdrawn through line 64 and fed to the second evaporator 60 in which the solution is further concentrated. The sulfate is less soluble in the concentrated solution discharged from evaporator 60 through line 66 and can be separated from the dichromate solution by means of a centrifuge 68. The sulfate is withdrawn from centrifuge 68 and dried in a drier 70.

The liquid effluent from centrifuge 68 containing the dichromate is fed by line 72 to the third evaporator 62 in which the dichromate solution is further concentrated to form a slurry, the solids of which are removed by centrifuge 74 and dried in drier 76. The liquid from centrifuge 74 can be, if desired, recycled to the second evaporator 60 to remove the sulfate and dichromate therefrom.

However, it will be understood by those skilled in the art that a variety of other methods can be used in accordance with the practice of the invention to effect the separation of the dichromate from the sulfate in lieu of the method described above.

While the process has been described with reference to a continuous process, it will be understood by those skilled in the art that the process of the present invention can also be carried out on a semi-continuous or batch-wise basis.

Having illustrated the basic concepts of the invention, reference is now made to the following examples which are provided by way of illustration, and not by way of limitation, of the practice of the invention.

EXAMPLE 1

This example illustrates the reaction of a high carbon ferrochrome alloy with a molten mixture of sodium nitrate.

The ferrochrome used in this example is a ferrochrome marketed by Union Carbide and has the following composition:

| | |
|---|---|
| Chromium | 65.76% by wt. |
| Carbon | 5.56% by wt. |
| Silicon | 1.50% by wt. |
| Iron | 27.18% by wt. |
| Impurities (Vanadium) | traces |

An open cast iron crucible is charged with 808 g. of sodium nitrate and 90 g. of sodium carbonate, and is then heated to a temperature of about 350°C. at which the carbonatenitrate mixture is in the molten state.

Thereafter, 150 g. of the ferrochrome alloy powder (40 to 200 mesh) is added, and the temperature of the molten mixture rises to about 450°C. At this point an additional 100 g. of the powdered alloy is added and the temperature of the bath continues to rise, accompanied by vigorous foaming as a result of the evolution of $N_2O$, NO and $CO_2$ gases. The temperature rises to about 520°C. and the reaction appears to slow down so an additional 100 g. of the powdered alloy, and the evolution of reaction gases again increases.

Then, the crucible is heated to 650°C. until the gas evolution subsides, and the crucible is further heated to 700°C. until gas evolution ceases. The total reaction time is about 2 hours.

The bath is allowed to cool, and is admixed with water, and the undissolved residue, largely $Fe_2O_3$, is filtered off. The resulting solution has a pH of about 12.7.

The solution is slightly acidified with sulfuric acid to a pH of about 9 to precipitate the vanadium in oxidized form. The leach solution is then crystallized to provide sodium sulfate and sodium chromate. Acidification of the leach solution to a pH below 6.5 with sulfuric acid will provide sodium dichromate and sodium sulfate, which can be separated in a conventional manner to provide sodium dichromate containing .001% by weight or less vanadium, .002% by weight or less sodium sulfate and having a purity of 95 to 97% by weight. Conversion of the ferrochrome to sodium chromate is 93%.

EXAMPLE 2

The procedure of Example 1 is repeated except that the bath contains 90% by weight potassium nitrate and 10% by weight potassium carbonate. Comparable results are obtained.

EXAMPLE 3

This example illustrates the use of chromite ore in preparing sodium chromate and sodium dichromate in accordance with the concept of this invention.

Chromite ore having a composition about the same as that shown in Table II is fed to a three phase electric arc furnace of the type described.

The molten ferrochrome alloy is discharged from the furnace, separated from the slag and allowed to solidify. Thereafter, the alloy, containing 5% by weight carbon, is crushed to provide finely divided ferrochrome particles having mesh sizes of 40 to 200. The finely divided ferrochrome particles are continuously sprayed onto the surface of a molten bath containing 90% by weight sodium nitrate and 10% by weight sodium carbonate maintained at a temperature of about 400°C. in a gas-fired furnace.

The ferrochrome is continuously sprayed onto the surface of the bath over a four hour period, during which the temperature of the bath increases to about 750°C. The total amount of ferrochrome added represents a molar ratio of nitrate to chromium of 2.1:1.

The molten bath is poured out of the furnace and is allowed to cool and solidify. Upon cooling, it has the appearance of a porous yellow mass. The solid cake is then crushed, and mixed with water to form a slurry of sodium chromate and ferric oxide which is separated by filtration. The resulting chromate solution contains about 50% sodium chromate by weight, and has a pH of about 12.5. The conversion of chromium to chromate is about 97%.

The pH of the solution is lowered to about 9 by the addition of sulfuric acid and vanadium hydroxide precipitates from the solution. Thereafter, additional sulfuric acid is added in about stoichiometric amounts to convert the chromate solution to a mixture of sodium dichromate and sodium sulfate. The sulfate is separated from the dichromate in the manner described.

EXAMPLE 4

Ferrochrome prepared in the manner described in Example 3 and having a carbon content of about 5% by weight is added to a bath comprising 90% by weight sodium nitrate and 10% by weight sodium carbonate and maintained at a temperature of 390°C. in a gas-fired furnace. Addition of the ferrochrome is made in about four increments in which each increment is added after the evolution of gases resulting from the preceding addition has subsided. Thus, each increment is added at one-half hour intervals over the course of a 2½ hour reaction period. The amount of ferrochrome added during the course of the reaction is an amount sufficient to provide a molar ratio of nitrate contained in the bath to chromite contained in the ferrochrome of about 2.2:1.

During the evolution of reaction gases, air is continuously pumped into the reaction vessel in order to aid in the removal of the reaction gases and to minimize the formation of chromium in the +3 oxidation state.

The molten bath is poured out of the furnace after the evolution of reaction gases has subsided after the addition of the last increment of ferrochrome and then is allowed to cool and solidify. Thereafter, the solid cake is crushed and mixed with water to form a slurry of sodium chromate and ferric oxide. Ferric oxide is filtered out to leave a sodium chromate solution containing about 51% sodium chromate by weight, and having a pH of about 12.4. Conversion of chromite contained in the ferrochrome added is about 95%.

The resulting solution containing the sodium chromate can be further treated, if desired, to convert the chromate contained therein to sodium dichromate as described in Example 3.

It will be apparent from the foregoing that I have provided a new and improved process for producing alkali metal chromate and dichromate in which use can be made of a starting metal which is more concentrated in chromium than chromium previously used in the prior art, such as in the soda ash process. The ferrochrome alloy used in accordance with the practice of the present invention can conveniently be prepared by smelting chromite ore in the presence of carbon to provide a ferrochrome having the desired carbon level and in which most of the gangue material contributing to large material handling problems in the prior art is removed prior to reaction of the ferrochrome in producing the chromate and/or dichromate.

It will be understood that various changes and modifications can be made in the details of formulation, procedure and equipment without departing from the spirit of the invention, especially as defined in the following claims.

I claim:

1. A process for producing alkali metal chromates comprising slowly adding a finely divided ferrochrome alloy containing 1% to 10% by weight carbon wherein the ferrochrome alloy is suspended in an oxygen-containing gas and sprayed onto the surface of a molten mixture comprising an alkali metal nitrate and an alkali metal carbonate wherein the alkali metal carbonate constitutes between 2–15% by weight of the mixture at a temperature of 350°C to 900°C, and separating the alkali metal chromate produced.

2. A process as defined in claim 1 wherein said alkali metal is sodium.

3. A process as defined in claim 1 wherein said ferrochrome contains 4 to 8% carbon by weight.

4. A process as defined in claim 1 wherein the reaction is carried out at a temperature within the range of 400° to 700°C.

5. A process as defined in claim 1 wherein the molar ratio of the alkali metal nitrate in the mixture to chromium contained in the ferrochrome is within the range of 1.5:1 to 2.5:1.

6. A process as defined in claim 1 wherein the ferrochrome contains at least 60% chromium.

7. A process as defined in claim 1 wherein the ferrochrome contains 60–70% chromium.

8. A process as defined in claim 1 wherein the ferrochrome contains 15–35% iron.

9. A process as defined in claim 1 wherein the reaction is carried out for a period of from .1 to 10 hours.

10. A process as defined in claim 1 wherein the ferrochrome has mesh sizes within the range of 40–200 mesh.

11. A process as defined in claim 1 wherein said oxygen-containing gas is air.

12. A process as defined in claim 1 which includes the step of leaching the chromate contained in the mixture with water.

13. A process as defined in claim 1 wherein the reaction evolves oxides of nitrogen.

14. A process as defined in claim 13 which includes the step of absorbing the nitric oxide evolved in aqueous alkali metal hydroxide to regenerate an alkali metal nitrate.

15. A process as defined in claim 14 which includes the step of feeding the regenerated alkali metal, nitrate to the molten mixture.

16. A process as defined in claim 1 which includes the step of forming the ferrochrome by smelting chromite ore in the presence of carbon.

17. A process as defined in claim 1 which includes the step of separating the chromate from the mixture and reacting the chromate with sulfuric acid to form the corresponding dichromate.

18. A process for producing alkali metal chromates comprising adding between one-third and one-tenth of the total amount of a finely divided ferrochrome alloy containing 1% to 10% by weight carbon in at least three increments to a molten mixture comprising an alkali metal nitrate and an alkali metal carbonate wherein the alkali metal carbonate constitutes between 2–15% by weight of the mixture at a temperature of 350°C to 900°C and separating the alkali metal chromate produced.

19. A process as defined in claim 18 wherein each increment is added after the evolution of gases begins to subside.

* * * * *